May 26, 1964     S. LEWIS     3,134,360

ANIMAL FEEDING DEVICE

Filed Aug. 31, 1962

INVENTOR.
SAMUEL LEWIS
BY Kelman and Berman
Agents

United States Patent Office 3,134,360
Patented May 26, 1964

3,134,360
ANIMAL FEEDING DEVICE
Samuel Lewis, 10 Lincoln Place, White Plains, N.Y.
Filed Aug. 31, 1962, Ser. No. 220,819
2 Claims. (Cl. 119—51)

This invention relates to animal feeding devices, and more particularly to a device for making a plurality of food receptacles alternatively available to an animal when the animal operates the device.

The device of the invention is particularly intended for use with dogs, monkeys, and other pets who enjoy a challenge to their intelligence, but it is not necessarily limited to any particular animal to be fed.

The object of the invention is to provide a feeding device which permits an animal to select one type of food among a plurality of food types offered or to make an additional amount of food available when a first accessible amount of food is exhausted.

Another object of the invention is to provide a toy for a domesticated animal or pet which requires the animal to perform certain operations, and rewards the animal with a gift of food for successful performance.

Other objects and features of the invention will become apparent as the disclosure is made in the following detailed description of a preferred embodiment of the invention as illustrated in the accomanying sheet of drawings in which.

Figure 1:
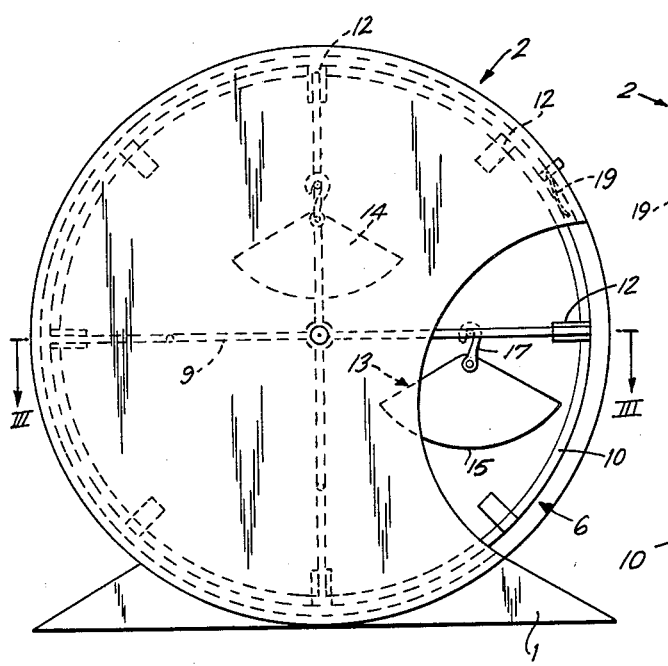
FIG. 1 shows a feeding device of the invention in side elevation.
Figure 2:
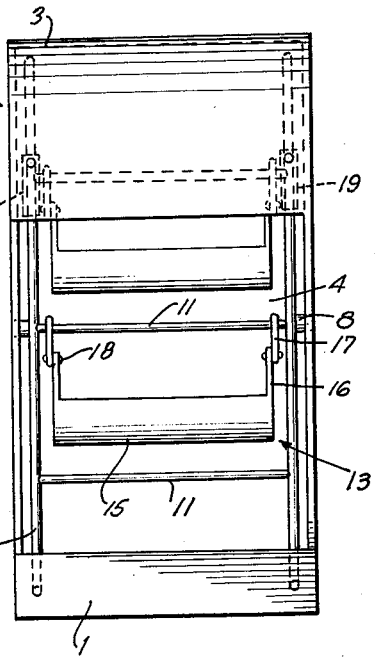
FIG. 2 illustrates the device of FIG. 1 in front elevation.
Figure 3:
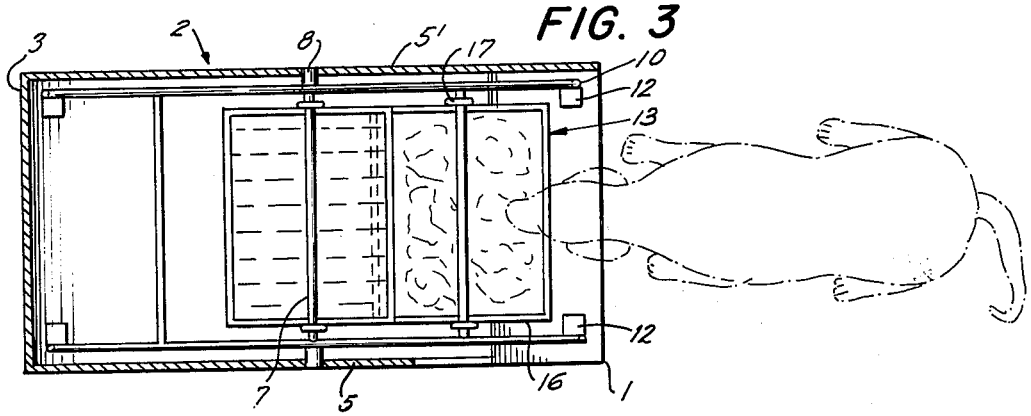
FIG. 3 is a sectional plan view of the feeding device of FIG. 1, the section being taken on the line III—III.

Referring now to the drawing in detail, there is seen a support 1 on which a cylindrical hollow sheet metal shell 2 is fixedly mounted. The axis of the shell 2 is normally horizontal. A portion of the circumferential wall 3 of the shell 2 is cut away to provide an opening 4 extending over an angle of almost 90° relative to the shell axis. One of the radial shell walls 5, 5' is cut out adjacent the opening 4. Tht cut-out in the wall 5 extends circumferentially about the same angle as the opening 4, and from the circumferential wall 5 toward the shell over about one half of the shell radius.

A wheel 6 is coaxially rotatable in the cavity of the shell 2. The wheel 6 which is made of strong wire has a shaft 7 the ends of which are journaled in bushings 8 on the shell 2. A set of four spokes 9 extends radially outward from the shaft 7 adjacent each housing 8. The spokes extend in two perpendicular axial planes. The radially outer ends of each set of spokes are joined by a ring 10. The central portion of each spoke 9 is connected with the central portion of a corresponding spoke in the other set by an axial wire rod 11. Eight abutment members 12 project radially from each ring 10 toward the other ring. The abutment members are uniformly spaced about the circumference of each ring. The axial spacing of the abutment members thus is 45°.

Each rod 11 is adapted to carry a food receptacle, and the device illustrated is normally equipped with four such receptacles. For the sake of clarity, however, only two receptacles 13, 14 have been shown. Each receptacle is upwardly open and has an approximately cylindrically curved bottom 15 and two axial end walls 16 which have the shape of a sector of a circle. A hook 17 is attached to each end wall by a pivot pin 18 and is hooked over an end portion of the corresponding wire rod 11. The hooks are rotatable on the rod 11. The pivotal engagement of the hooks 17 with the remainder of the food receptacle 13, 14 prevents accidental spilling of food if excessive friction should develop between the hooks 17 and the rod 11 because of contamination with food particles or the like.

Two leaf springs 19 mounted on the shell 2 above the opening 4 respectively abut against the rings 10. The friction of the springs 19 against the rings 10 is sufficient to prevent any spontaneous rotation of the wheel 6 when the same carries an unbalanced load as in the illustrated example in which the weight of the receptacle 13 would rotate the wheel 6 clockwise as viewed in FIG. 1 if the leaf springs 19 would not provide a brake.

The afore-described device is operated as follows:

The receptacles are removed from the wheel 6 by sequentially bringing the receptacles in the position of the receptacle 13 shown in the drawing. They may be charged with different types of food for an animal, or with several batches of the same type of food and placed on respective rods 11. A normally intelligent dog 19 readily learns how to make another receptacle available after the one positioned before the opening 4 is emptied, or if the other receptacle contains more attractive food. He steps on the abutment members so that the food receptacles move sequentially downward past the opening 4. The angle over which the opening 4 extends is smaller than the angular spacing between successive receptacles. Only one receptacle is accessible to the animal at any one time as long as the angle defined by the opening 4 about the wheel axis is not substantially greater than that defined by circumferentially consecutive food receptacles.

The abutment members 12 are well suited for actuation of wheel rotation by a dog, but more sophisticated wheel rotating means accessible from outside the shell 2 will readily suggest themselves for use by a monkey or other animal.

It should be understood, of course, that the foregoing disclosure relates to only a preferred embodiment of the invention, and that it is intended to cover all changes and modifications of the example of the invention herein chosen for the purpose of the disclosure which do not constitute departure from the spirit and scope of the invention set forth in the appended claims.

What I claim is:

1. An animal feeding device comprising, in combination:

(a) a shell member enclosing a cavity;
(b) wheel means rotatable in said cavity about a horizontally extending axis;
(c) a plurality of open receptacles releasably mounted on said wheel means for rotation about respective horizontal axes radially spaced from the axis of said wheel means, said receptacles being angularly spaced about said axis; and
(d) a plurality of abutment members on said wheel means, said abutment members being angularly spaced about the axis of said wheel means;
(e) said shell member having a wall extending axially and circumferentially relative to the axis of said wheel means, and being spaced from the last mentioned axis, said wall being formed with an opening communicating with said cavity and extending circumferentially about the axis of said wheel means over an angle not substantially greater than the angular spacing of said receptacles, (f) whereby said receptacles and said abutment members sequentially move past said opening during rotation of said wheel means about the axis thereof.

2. A device as set forth in claim 1, further comprising brake means for arresting spontaneous rotation of said wheel means about said axis.

References Cited in the file of this patent

UNITED STATES PATENTS

| | | |
|---|---|---|
| 1,437,004 | Neumann | Nov. 28, 1922 |
| 1,865,921 | Kohl | July 5, 1932 |
| 2,275,887 | Chandler | Mar. 10, 1942 |
| 2,528,742 | Coffing | Nov. 7, 1950 |
| 2,566,899 | Mangieri | Sept. 4, 1951 |
| 3,033,164 | Evers | May 8, 1962 |